United States Patent
Kim et al.

(10) Patent No.: US 8,833,775 B2
(45) Date of Patent: Sep. 16, 2014

(54) ELECTRONIC CONTROL SUSPENSION SYSTEM FOR VEHICLES

(71) Applicant: Hyundai Motor Company, Seoul (KR)

(72) Inventors: Jong Min Kim, Seoul (KR); Sung Bae Jang, Gyeonggi-do (KR); Bo Min Kim, Seoul (KR); Dae Sik Ko, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/829,217

(22) Filed: Mar. 14, 2013

(65) Prior Publication Data

US 2014/0175763 A1    Jun. 26, 2014

(30) Foreign Application Priority Data

Dec. 26, 2012 (KR) .......................... 10-2012-0153730

(51) Int. Cl.
*B60G 17/015* (2006.01)

(52) U.S. Cl.
CPC .................................. *B60G 17/0152* (2013.01)
USPC .............. 280/5.514; 280/6.157; 280/124.145; 280/788; 701/37

(58) Field of Classification Search
USPC ..................... 280/5.514, 6.157, 124.145, 788; 74/89.23; 267/216, 275, 278, 286; 701/89.23

See application file for complete search history.

(56) References Cited

U.S. PATENT DOCUMENTS

| | | | | |
|---|---|---|---|---|
| 3,530,734 A | * | 9/1970 | Wray et al. | 74/89.3 |
| 5,129,273 A | * | 7/1992 | Fukui et al. | 74/89.35 |
| 5,193,408 A | * | 3/1993 | Fukui et al. | 74/89.35 |
| 7,469,910 B2 | * | 12/2008 | Munster et al. | 280/5.514 |
| 7,644,935 B2 | * | 1/2010 | Munster et al. | 280/5.514 |
| 7,874,561 B2 | * | 1/2011 | Michel | 280/6.157 |
| 7,922,181 B2 | * | 4/2011 | Hakui et al. | 280/6.157 |
| 7,926,822 B2 | * | 4/2011 | Ohletz et al. | 280/5.514 |
| 7,931,286 B2 | * | 4/2011 | Melcher | 280/124.103 |
| 2002/0089107 A1 | * | 7/2002 | Koh | 267/218 |
| 2005/0021205 A1 | * | 1/2005 | Niwa et al. | 701/37 |
| 2005/0090956 A1 | * | 4/2005 | Ogawa | 701/37 |
| 2006/0163863 A1 | * | 7/2006 | Ellmann et al. | 280/788 |
| 2009/0057969 A1 | * | 3/2009 | Michel | 267/218 |
| 2010/0025946 A1 | * | 2/2010 | Inoue et al. | 280/6.157 |

FOREIGN PATENT DOCUMENTS

| | | |
|---|---|---|
| JP | 2001-301436 A | 10/2001 |
| KR | 10-2009-0036215 A | 4/2009 |
| KR | 10-2011-0057667 A | 6/2011 |

* cited by examiner

*Primary Examiner* — Faye M Fleming
*Assistant Examiner* — Darlene P Condra
(74) *Attorney, Agent, or Firm* — Edwards Wildman Palmer LLP; Peter F. Corless

(57) ABSTRACT

An electronic control suspension (ECS) system for vehicles is provided. The ECS system includes a strut assembly which is coupled to a vehicle body, and a lower portion of which is inserted through the housing so as to absorb the rocking from the wheel. A vehicle-height control module converts a rotating force of a motor to a linear motion of the strut assembly when the rotating force of the motor is provided to a screw section thereof surrounding the strut assembly. This allows the strut assembly to be vertically moved relative to the housing, thereby controlling the height of a vehicle.

5 Claims, 4 Drawing Sheets

ELECTRONIC CONTROL SUSPENSION SYSTEM FOR VEHICLES

CROSS-REFERENCE

This application claims priority under 35 U.S.C. §119 to Korean Patent Application No. 10-2012-0153730 filed on, Dec. 26, 2012, the disclosure of which is hereby incorporated by reference in its entirety.

BACKGROUND

1. Field of the Invention

The present invention relates, in general, to an electronic control suspension (ECS) system for vehicles and, more particularly, to an electronic control suspension (ECS) system for vehicles which automatically controls the height of a vehicle by changing a position of a strut assembly having a shock absorber using a motor.

2. Description of the Related Art

Generally, a suspension system is understood to be a system that includes a shock absorber, a spring, a suspension arm, etc. in order to absorb shocks occurring from the road so as to minimize the shocks being transmitted to a vehicle body or an occupant. Such a suspension system is supported by the spring and the shock absorber in the vertical direction, and properly trades off stiffness against compliance in other directions, thereby mechanically properly adjusting the relative movement between a vehicle body and wheels. Further, the suspension system also serves to keep tires in close contact with the ground, allowing the vehicle body to be close to the ground when driven at a high speed.

However, when vehicle's height is low to the ground, vehicles may collide with or scrape speed bumps on the road or uneven portions on unpaved roads while driving, and when driving conditions such as a rolling action, a pitching action, etc. occur, vehicles are inclined accordingly, degrading driving comfort and steering stability.

Thus, for automatic control of a vehicle position, an electronic control suspension for electronic control of a shock absorber has been developed and used, and an active suspension which employs an reactive hydraulic system has also been used instead of a plate and a shock absorber to control vehicle's vibrations to suit driving conditions, allowing driving stability and steering stability to be obtained.

However, the existing active suspension needs various elements such as a hydraulic pump, a reservoir, a hydraulic line, a hydraulic cylinder, and the like, making the existing system a complicated active suspension system which also lowers fuel efficiency by the nature of a hydraulic mechanism, and increases $CO_2$ emissions.

Furthermore, some suspensions systems merely provide a general strut structure, so it cannot control the position of a vehicle by changing a position of a strut assembly and thereby automatically controlling the height of the vehicle.

The description regarding the related art is provided only for understanding of the background of the invention, so it should not be construed by ordinarily skilled persons in the art to be admitted to be the related art.

SUMMARY

Accordingly, the present invention has been made keeping in mind the above problems occurring in the related art, and the present invention is intended to propose an electronic control suspension system for vehicles which automatically controls the height of a vehicle by changing a position of a strut assembly having a shock absorber using a motor.

In order to achieve the above object, according to one aspect of the present invention, there is provided an electronic control suspension (ECS) system for vehicles, including: a housing having an open upper end and a lower end coupled to a wheel. A strut assembly coupled to a vehicle body is also provided. An upper end and a lower portion are inserted through the upper end of the housing so as to absorb rocking transmitted from the wheel. Furthermore a control module is configured to convert the rotating force of the motor to a linear motion of the strut assembly when a rotating force of a motor is provided to a screw section thereof surrounding the strut assembly. This allows the strut assembly to be vertically moved relative to the housing, thereby controlling the height of a vehicle.

The vehicle-height control module may include the motor providing forward and backward rotations, and a first rotary gear rotating using the rotating force from the motor; a lifting shaft fitted around the strut assembly and having a first screw section on its outer circumferential surface. A second rotary gear may be fitted into the lifting shaft, and an outer circumferential surface of which is engaged with the first rotary gear and has a second screw section on its inner circumferential surface such that the second screw section is spirally coupled to and rotates along the first screw section, allowing the lifting shaft to be linearly moved upward or downward.

An elastic member may be provided between an end of the inside of the housing and a lower end of the lifting shaft to compensate for torque of the motor and reduce load applied to the motor and the lifting shaft. The elastic member may be a spring, for example.

According to the present invention, an electronic control suspension (ECS) system controls a position of a vehicle in real time when the vehicle is in a variety of driving conditions such as turning, braking, accelerating, etc., thereby improving not only steering stability under the control of rolling, yawing, pitching, or the like, but also driving comfort with a reduction in the rolling action.

Moreover, the ECS system keeps a position of a vehicle constant when the vehicle is travelling over raised spots or an uneven road, obtaining a flat ride while always maintaining height of a vehicle constant irrespective of the weight of occupants and freight loaded in the vehicle, such that the height of a vehicle is lowered at a high speed, improving driving comfort as well as fuel efficiency, and the height of a vehicle is raised when the vehicle is driving in an off road condition, protecting the vehicle from coming into contact with the ground.

Further, the ECS system is more simplified than a hydraulic vehicle posture control system, reducing weight and costs of a vehicle and thereby improving fuel efficiency and reducing CO2 emissions.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
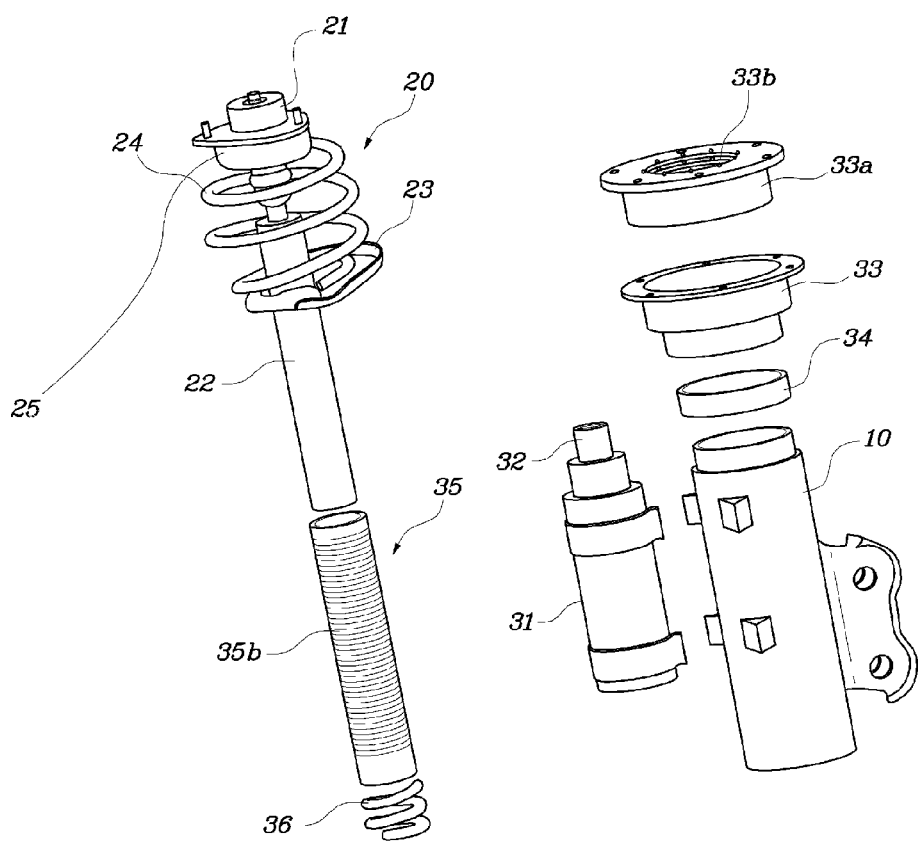
FIG. 1 is an exploded view showing the construction of an electronic control suspension (ECS) system for vehicles according to the exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller (e.g., a converter controller). The term controller refers to a hardware device that includes a memory and a processor. The memory is configured to store the modules/units and the processor is specifically configured to execute said modules/units to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
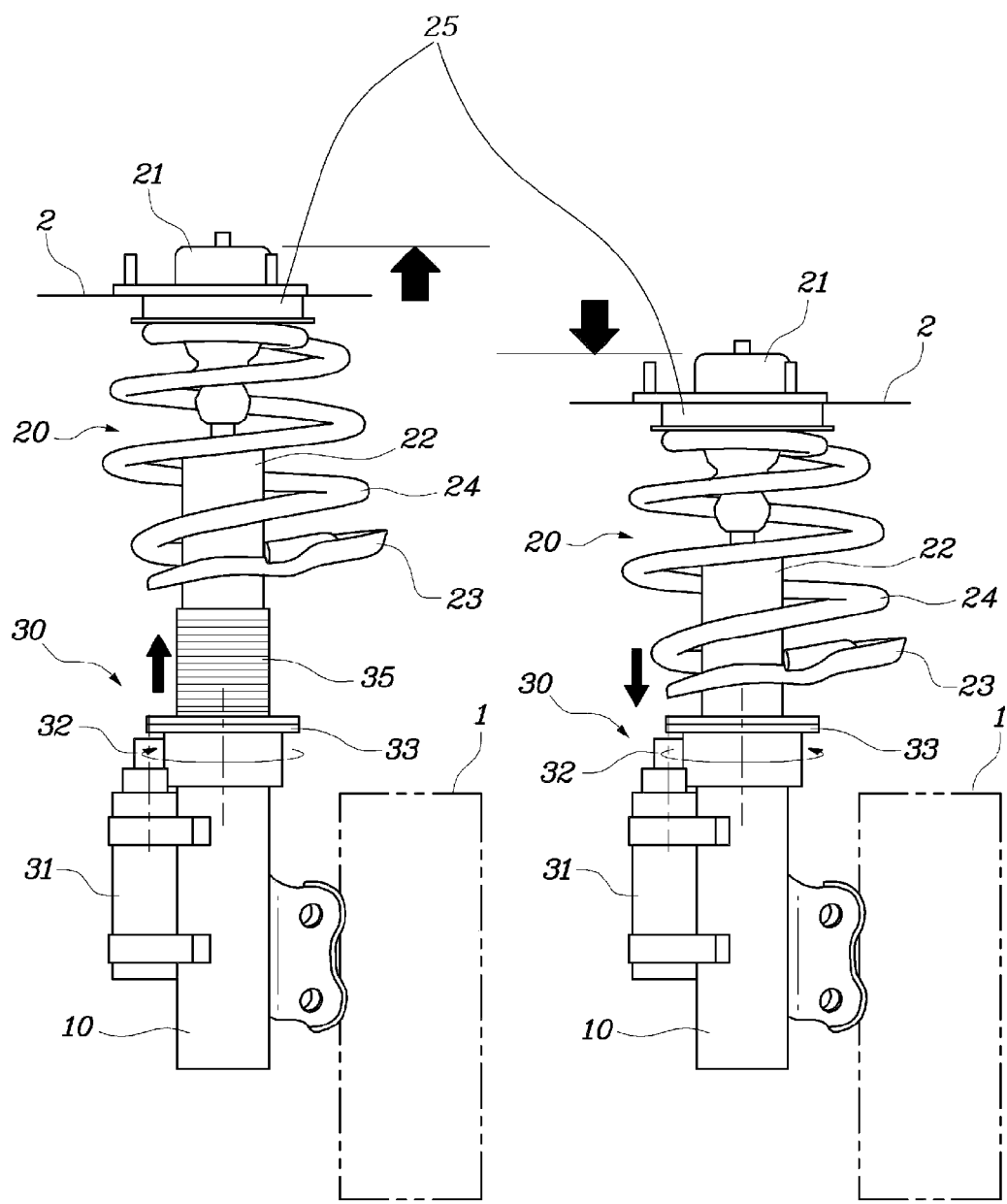
FIG. 2 is a view explaining the operation of controlling the height of a vehicle using the ECS system.
Figure 3:
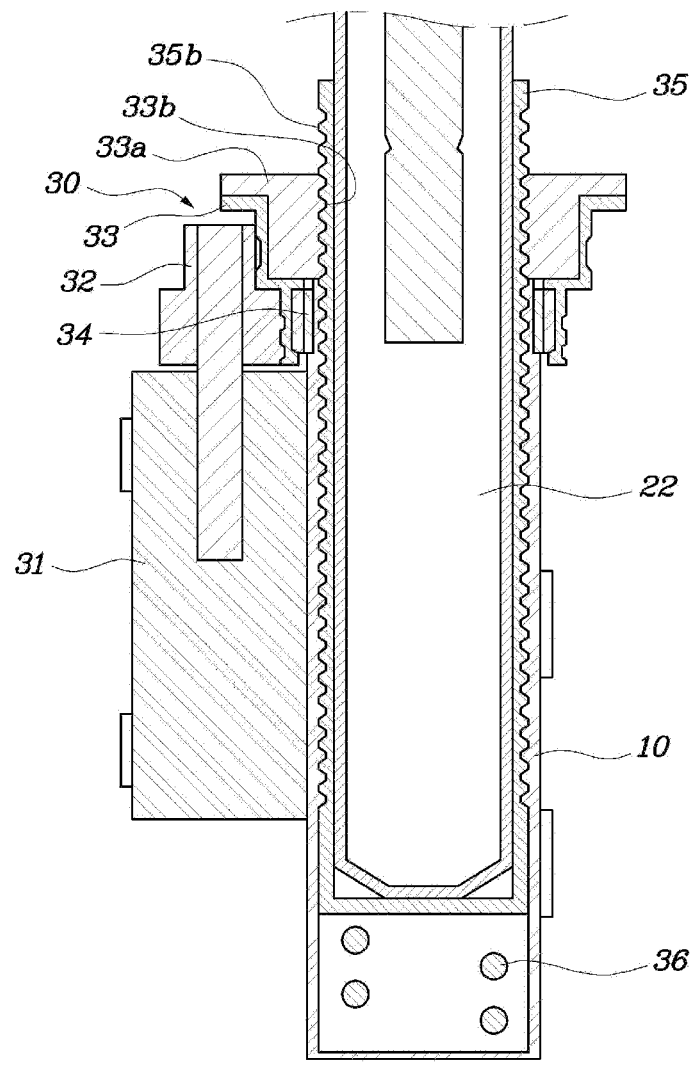
FIG. 3 is a cross-sectional view showing the structure of a vehicle-height controller according to the present invention.

FIG. 1 is an exploded view showing the construction of an electronic control suspension (ECS) system for vehicles according to the present invention, FIG. 2 is a view explaining the operation of controlling the height of a vehicle using the ECS system, and FIG. 3 is a cross-sectional view showing the structure of a vehicle-height controller 30 according to the present invention.

Referring to FIG. 1, the ECS system generally includes a housing 10, a strut assembly 20, and a vehicle-height controller 30. Specifically, the ECS system includes the housing 10 which has an open upper end and a lower end coupled to a wheel 1, the strut assembly 20 which is coupled to a vehicle body 1 at the strut's upper end and a lower portion of which is inserted through the upper end of the housing 10 so as to absorb rocking transmitted from the wheel 1, and a vehicle-height controller 30 which is designed, when a rotating force of a motor 31 is provided to a screw section thereof surrounding the strut assembly 20, to convert the rotating force of the motor to a linear motion of the strut assembly 20, allowing the strut assembly 20 to be vertically moved relative to the housing 10, thereby controlling the height of a vehicle. That is, the housing 10 is formed like a barrel with an open upper end, and the lower end of the housing is coupled to the side of the wheel 1 via a knuckle (not shown).

The strut assembly 20 is coupled to the vehicle body 2 at its upper end, and the lower end of the strut assembly is inserted through the open upper end of the housing 10 so as to absorb and reduce vibrations and rocking transmitted from the wheel 1, preventing them from being transmitted to the vehicle body 2. Additionally, the strut assembly 20 includes a shock absorber 22 and a spring 24, and is configured such that an upper seat (not indicated) and an insulator 21 are mounted on an upper end of the shock absorber 22 such that the insulator 21 is fixedly coupled to the vehicle body 2. A lower seat 23 is fixed to the end portion of the shock absorber 22, while a spring 24 is elastically arranged between the lower seat 23 and the insulator 21 so as to absorb vibrations transmitted from the wheel 1. Further, the shock absorber 22 restricts the flexible action of the spring 24 so as to stabilize the vehicle body 2.

The vehicle-height control module 30 is connected and mounted between the housing 10 and the strut assembly 20, and is designed, when a rotating force of a motor 31 is provided to a screw section thereof surrounding the strut assembly 20, to convert the rotating force of the motor to a linear motion of the strut assembly 20, allowing the strut assembly 20 to be moved upward or downward, thereby controlling the height of a vehicle. That is, the rotating force by the motor 31 is converted to a linear motion of the strut assembly by the vehicle-height control module 30, so that the strut assembly 20 is moved upward or downward to control the height of a vehicle.

Referring to FIGS. 1 to 3, the vehicle-height control module 30 includes the motor 31 which provides forward and backward rotations, a first rotary gear 32 which rotates using the rotating force from the motor, a lifting shaft 35 which is fitted around the strut assembly 20 and which has a first screw section 35$b$ on its outer circumferential surface, and a second rotary gear 33 which is fitted into the lifting shaft 35, an outer circumferential surface of which is engaged with the first rotary gear and which has a second screw section 33$b$ on its inner circumferential surface such that the second screw section 33$b$ is spirally coupled to and rotates along the first screw section 35$b$, allowing the lifting shaft 35 to be linearly moved upward or downward.

Additionally, the motor 31 may be mounted to a portion of an outer side surface of the housing 10 by a separate bracket, and the first rotary gear 32 may be fixed to an end of a rotary axis of the motor 31 so that it rotates when the motor is driven. Here, the motor 31 can be controlled by a controller 40 mounted in a vehicle. The controller 40 may be an electronic control unit (ECU).

While the second rotary gear 33 may be provided on its inner circumferential surface with the second screw section 33$b$, as shown in FIGS. 1 and 3, the second screw section 33$b$ may be formed on an inner circumferential surface of a ball nut 33$a$ which is to be fixedly inserted into the second rotary gear 33. Further, the second rotary gear 33 is fitted around the lifting shaft 35 while being engaged with the first rotary gear 32, so that the second rotary gear serves as a reduction gear for the rotating force from the motor 31 and the first rotary gear 32. Here, the first and second screw sections 35$b$ and 33$b$ may be of a ball screw structure so that they are rotated relative to each other.

A bearing 34 may be mounted on an outer circumferential surface of an upper portion of the housing 10 such that an inner circumferential surface of a lower end of the second rotary gear 33 is disposed in a proximity to an outer circumferential surface of the bearing 34. Thereby, when the second rotary gear 33 is rotated, the second rotary gear 33 is prevented from interfering with the outer circumferential surface of the housing 10.

Further, a lower end of the shock absorber 22 is interference-fitted into the lifting shaft 35, so that the strut assembly 20 including the shock absorber 22 is moved together with the lifting shaft 35. That is, when the motor 31 is driven, the first rotary gear 32 is rotated together with the second rotary gear 33 which was engaged with the first rotary gear 32. Then, the lifting shaft 35, which was coupled with the second rotary gear 33 using the ball screw structure, is moved upwards or downwards relative to the housing 10 according to the rotating direction of the second rotary gear 33. Here, the lifting shaft 35 is moved together with the shock absorber 22 that is an element of the strut assembly, allowing the entire strut assembly 20 to be moved upwards or downwards, thereby controlling the height of a vehicle.

Referring to FIG. 3, an elastic member 36 is disposed between an end of the inside of the housing 10 and the lower end of the lifting shaft 35, providing elastic force to the lifting shaft 35. Here, the elastic member 36 may be a spring. That is, when the motor 31 provides rotating force to move the lifting shaft 35 upward, the spring exerts a force to push the lifting shaft 35 upwards, so that starting torque of the motor 31 is reduced to compensate for operating torque and thus lessen a load applied to the motor 31 and the housing 10.

Figure 4:
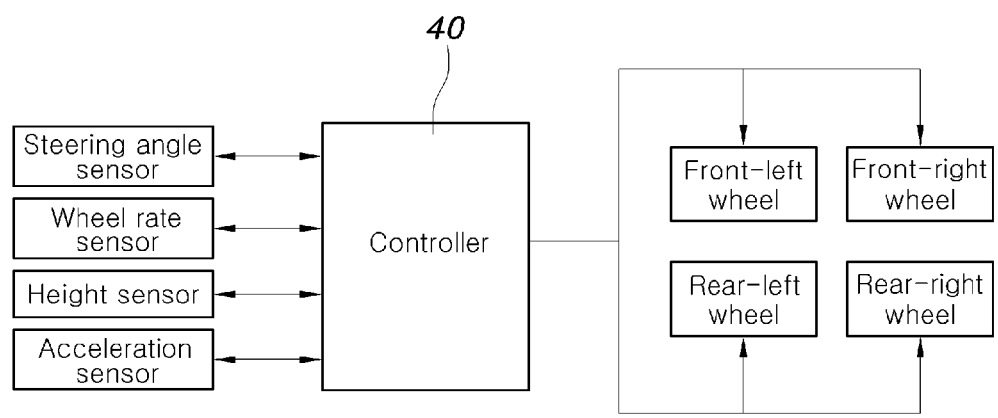
FIG. 4 is a view showing an exemplary control of a motor according to the exemplary embodiment of the present invention.

FIG. 4 is a view showing an exemplary control of the motor 31 according to the exemplary embodiment of the present invention. Referring to FIG. 4, the controller 40 is configured to control the operation of the motor 31 by receiving various driving parameter values measured by a multiplicity of sensors mounted in a vehicle, and calculating control parameter values for the control of vehicle posture based on the measured parameter values. Here, the vehicle-height control modules 30 including the motor 31 may be separately mounted on the wheels of a vehicle, respectively, thereby increasing reliability and precision of vehicle-height control.

The sensors may be connected to the controller 40 either wirelessly or wired and may include a steering angle sensor, a wheel rate sensor, a height sensor, upper and lower acceleration sensors, or the like, so that load shift, roll stiffness of front and rear wheels, loads applied to springs of respective wheels, rotating torque/direction of the respective motor 31, or the like can be calculated by the input values measured by the sensors, and thus the motors 31 mounted in the respective wheels 1 can be separately controlled based on this calculation.

Figure 5:
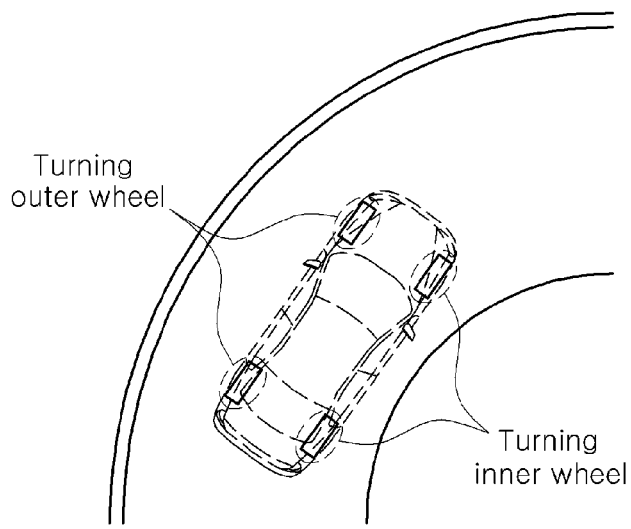
FIG. 5 is a view explaining an exemplary control of a vehicle's turning according to the exemplary embodiment of the present invention.

FIG. 5 is a view explaining an exemplary control of a vehicle's turning according to the exemplary embodiment of the present invention. Referring to FIG. 5, when a vehicle turns, the height of the vehicle in the inner side of the turn becomes higher than that of the outer side because of centrifugal force, so by using the control of the motor 31, the strut assembly 20 in the inner side of the turn is lowered, whereas the strut assembly 20 in the outer side of the turn is elevated, thereby controlling the position of a vehicle. Further, when a vehicle is suddenly stopped, the height of the rear of the vehicle becomes higher than that of the front of the vehicle, so by using the control of the motor 31, the strut assembly 20 in the front of the vehicle is raised and the strut assembly 20 in the rear of the vehicle is lowered, thereby stably controlling the position of the vehicle.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electronic control suspension (ECS) system for vehicles, comprising:
   a housing having an open upper end and a lower end coupled to a wheel;
   a strut assembly coupled to a vehicle body at an upper end of the strut assembly and a lower portion of which is inserted through the upper end of the housing to absorb rocking transmitted from the wheel;
   a lifting shaft fitted around a portion of the strut assembly;
   an elastic member provided between an end of the inside of the housing and a lower end of the lifting shaft to provide elastic force to the lifting shaft, wherein the elastic member exerts a force to push the lifting shaft upwards by a rotating force provided by a motor; and
   a vehicle-height control module that converts the rotating force of the motor to a linear motion of the strut assembly when the rotating force of the motor is provided to a screw section thereof surrounding a portion of the strut assembly to allow the strut assembly to be vertically moved relative to the housing to control the height of a vehicle.

2. The ECS system according to claim 1, wherein the vehicle-height control module includes:
   the motor providing forward and backward rotations;
   a first rotary gear rotating using the rotating force from the motor;
   the lifting shaft having a first screw section on an outer circumferential surface of the lifting shaft; and
   a second rotary gear fitted into the lifting shaft, an outer circumferential surface of which is engaged with the first rotary gear and having a second screw section on an inner circumferential surface of the second rotary gear wherein the second screw section is spirally coupled to and rotates along the first screw section, allowing the lifting shaft to be linearly moved upward or downward.

3. The ECS system according to claim 1, wherein the elastic member is a spring.

4. The ECS system according to claim 1, wherein the motor is controlled by a controller based upon signals received from a plurality of sensors installed around the vehicle.

5. The ECS system according to claim 4, wherein the sensors include at least a steering angle sensor, a wheel rate sensor, a height sensor, upper and lower acceleration sensors.

* * * * *